July 9, 1929.  A. B. LEECH  1,719,939
APPARATUS FOR PRODUCING MOTION PICTURE EFFECTS
Filed Nov. 12, 1927
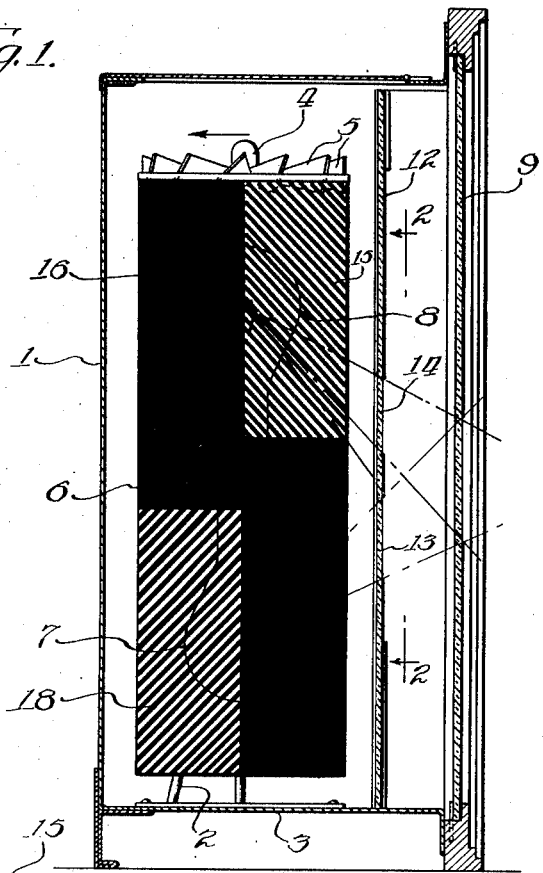
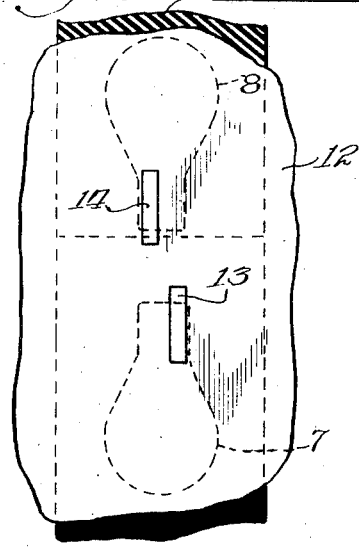
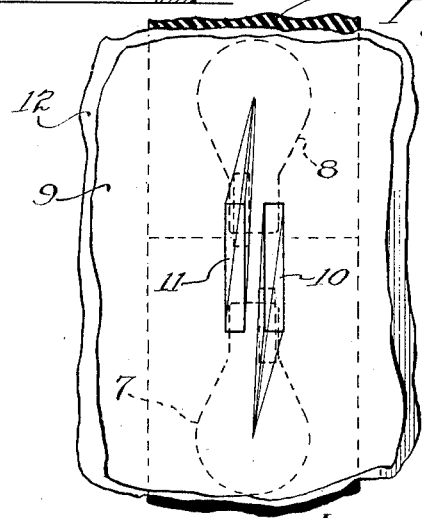
Inventor
Aubrey B. Leech.
By Rummler & Rummler,
Attys.

Patented July 9, 1929.

1,719,939

UNITED STATES PATENT OFFICE.

AUBREY B. LEECH, OF LOS ANGELES, CALIFORNIA.

APPARATUS FOR PRODUCING MOTION-PICTURE EFFECTS.

Application filed November 12, 1927. Serial No. 232,879.

This invention relates to apparatus for producing motion picture effects.

The main object of this invention is to provide an apparatus which will produce the illusion of motion traveling intermittently in opposite directions on different portions of an object screen.

An illustrative embodiment of this invention is shown in the accompanying drawing in which:

Figure 1 is a vertical transverse section of the apparatus with the movable cylindrical screen shown in elevation.

Fig. 2 is a fragmentary detail in elevation of the medial portion of the intermediate screen taken on the line 2—2 of Fig. 1.

Fig. 3 is a similar view of the object screen showing the method of projection of illusion effects from the sources of light to said screen.

Heretofore in the construction of advertising signs for producing motion picture effects, where it was desired to have intermittent motion traveling in opposite directions on different parts of the object screen, it was necessary to employ two moving cylindrical screens arranged side by side with each screen having its own independent source of light.

In the present invention, such illusion is created with the use of a single cylindrical screen having two sources of light arranged one above the other, thereby reducing the cost of manufacturing a sign quite materially.

In the constructions shown in the drawings, the apparatus is of the same general class as that shown in my Patent No. 1,369,751, dated February 22, 1921, in which a rectangular box-like casing 1 is provided with a skeleton framework 2 mounted on the base 3 which pivotally supports a hub 4 carrying a plurality of inclined vanes 5 which in turn carry a cylindrical screen 6. The screen 6 surrounds a pair of light bulbs 7 and 8 mounted on the framework 2, one above the other. The front of the sign is closed by a panel 9 preferably of glass, which is adapted to have a scene depicting motion painted thereon wherein the motion is to be in opposite directions, and intermittently.

For purposes of illustration, the object screen 9 is shown provided with a pair of spaced vertically disposed horizontally alined elongated portions 10 and 11 offset laterally relative to each other and; which are adapted to register with parts of the scene painted on the object screen wherein motion is depicted intermittently downwardly in the portion 10 and intermittently upwardly in the portion 11.

An intermediate screen 12 preferably of glass and having an opaque or translucent frosting thereon is interposed between the object screen 9 and the cylindrical screen 7 and is provided with spaced vertically disposed elongated portions 13 and 14 which are offset relative to each other from which the frosting has been scraped so as to direct the rays of light from the sources of light 7 and 8 through the openings 13 and 14 on to the portions 10 and 11 respectively of the object screen 9. The scraped portions 13 and 14 are sufficiently constructed to form illuminated areas on the object screen 9 in substantially the relation illustrated in Fig. 3.

In order to provide the illusion of intermittent motion, a cylindrical screen 6 has one-half of its upper peripheral surface provided with inclined lines 15, the other half of its peripheral surface being covered with solid opaque or translucent paint or frosting 16. The lower half of the cylindrical screen is similarly arranged but with the opposite half of its peripheral surface being lined as shown at 18, such lines being inclined in the opposite direction to the lines 15 so as to produce the illusion of motion in the opposite direction to that of the upper portion of the screen. The solidly opaque or translucent portions of the screen 6 extend past the medial line thereof so as to prevent the light rays from one source of light passing out through the openings in the intermediate screen intended for the other source of light.

In the operation of this apparatus, the heat from the light bulbs causes a current of air to pass up through the screen 6 in the usual manner, striking on the inclined vanes 5 and thereby rotating the cylindrical screen. When that portion of the screen 6 having the lines 15 thereon passes in front of the source of light 8, the shadows of the lines are projected upon the intermediate screen 12 and some of the light passes directly through the opening 14 of the intermediate screen 12 and is projected on to the object screen 9, thus producing the illusion of motion traveling in an upward direction on the portion 11 of said object screen.

While that portion of the cylindrical screen having the lines 15 thereon is interposed between the source of light and the opening 14 in the intermediate screen, the solidly opaque or translucent portion of the lower half of the screen is interposed between its source of light 7 and its respective opening 13 thus cutting off the projection of any illusion of motion to the object screen.

Similarly, when the screen is rotated a half a revolution and the light from the source 7 passes through the lined portion of the lower half of the cylinder 6, the shadows of the lines 18 are projected on the intermediate screen 12 and some of the light passes directly through the opening 13 on to the portion 10 of the object screen, thus producing the illusion of motion in a downward direction. At the same time such projection of shadows and light is taking place, the solidly opaque or translucent portion 16 on the upper half of the screen blocks the projection of light from its source through the opening 14 to the object screen. The intermediate opaque or translucent belt which extends completely around the cylinder 6 prevents the beam of light from the sources 7 and 8 from being projected through the opening 14 and 13 respectively as illustrated by dotted lines in Figs. 1 and 3 wherein dotted lines 7.1 illustrate the path of a beam of light formed by the source 7 and the lower lined section 18.

In this manner, the illusion of intermittent motion in opposite directions is projected on to the object screen at different points, but in the same horizontal plane.

The lines and the solidly painted portions of the cylindrical screen 6 may be either opaque or translucent with the remaining portions thereof, either transparent or translucent, that is, the lines and the remaining portions of the screen have different degrees of permeability to light rays.

The same is true of the intermediate screen wherein the openings 13 and 14 may either be transparent or translucent and the remaining portions of the screen either translucent or opaque or both. Various combinations having various degrees of permeability to light rays produce different illusions on the object screen as is well known in the use of this type of illuminated sign.

Although but one specific embodiment of this invention has been herein shown and described, it will be understood that details of the construction shown may be altered or omitted without departing from the spirit of this invention as defined by the following claims:

I claim:

1. In an apparatus for producing motion picture effects, a plurality of sources of light arranged one above another, an object screen adapted to have motion depicted thereon, a light transmitting movable screen interposed between said sources of light and said object screen, an intermediate screen for directing light from each of said sources to different portions of said object screen, that portion of said movable screen passing in front of each source of light being provided with areas alternately completely opaqued and alternately transparent and opaque lined, the arrangement of said areas being such that when a lined area is in front of one source of light, an opaque area is in front of the other source of light, the lined areas for each light having differently inclined lines for producing an illusion of motion in alternately different directions on said object screen.

2. In an apparatus for producing motion picture effects, two sources of light disposed one above the other, an object screen adapted to have a scene thereon in which motion is to be depicted intermittently in opposite directions, a stationary intermediate screen having light transmitting portions arranged so that the light from one of said sources is projected to that portion of said scene in which motion is depicted in one direction and from said other source to that portion of said scene in which motion is depicted in the opposite direction, a common movable screen for both said sources of light interposed between said source of light and said intermediate stationary screen, and means for preventing light from one of said sources passing through the light transmitting portion of said intermediate screen intended for the other of said sources of light.

3. In an apparatus for producing motion picture effects a casing having an object screen therein, spaced sources of light in the casing, means for alternately screening out rays of light first from one source of light and then from another, and an intermediate screen having spaced transparent areas therein each positioned for directing rays of light from a different one of said sources upon different portions of the object screen.

4. In an apparatus for producing motion picture effects, a casing having an object screen therein, spaced sources of light in said casing, a rotatably mounted screen located between said sources of light and said object screen having opposite sections for alternately screening out rays of light first from one source of light and then from another, and an intermediate screen having spaced transparent areas therein, each positioned for directing rays of light from a different one of said sources upon different portions of the object screen.

5. In an apparatus for producing motion picture effects, a casing having an object screen therein, spaced sources of light in said casing, a rotatably mounted screen located between said sources of light and said object screen and having spaced lines on one portion thereof extending diagonally in one direction and spaced lines on another portion extending in a different direction, and an intermediate screen having spaced transparent sections arranged in offset relation thereon, each section being in position for admitting rays of light from a different source to the object screen.

Signed at Los Angeles this 12th day of October, 1927.

AUBREY B. LEECH.